United States Patent
Sarangi et al.

(10) Patent No.: US 10,318,292 B2
(45) Date of Patent: Jun. 11, 2019

(54) HARDWARE INSTRUCTION SET TO REPLACE A PLURALITY OF ATOMIC OPERATIONS WITH A SINGLE ATOMIC OPERATION

(71) Applicant: Intel Corporation, Santa Clara, CA (US)

(72) Inventors: Satyajit Sarangi, Santa Clara, CA (US); Thomas F. Raoux, Mountain View, CA (US); Guei-Yuan Lueh, San Jose, CA (US); Subramaniam Maiyuran, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 885 days.

(21) Appl. No.: 14/543,027

(22) Filed: Nov. 17, 2014

(65) Prior Publication Data

US 2016/0139934 A1    May 19, 2016

(51) Int. Cl.
*G06F 9/30*    (2018.01)

(52) U.S. Cl.
CPC ........ *G06F 9/30032* (2013.01); *G06F 9/3001* (2013.01); *G06F 9/3004* (2013.01); *G06F 9/3017* (2013.01); *G06F 9/30036* (2013.01)

(58) Field of Classification Search
None
See application file for complete search history.

(56) References Cited

U.S. PATENT DOCUMENTS

| | | |
|---|---|---|
| 7,492,368 B1 | 2/2009 | Nordquist et al. |
| 7,681,019 B1 * | 3/2010 | Favor ............... G06F 9/4552 703/26 |
| 7,725,518 B1 | 5/2010 | Le Grand |
| 7,921,220 B2 | 4/2011 | Barsness et al. |
| 8,006,236 B1 | 8/2011 | Kilgard et al. |
| 8,364,739 B2 | 1/2013 | Baskaran et al. |
| 9,058,792 B1 | 6/2015 | Edmondson et al. |

(Continued)

FOREIGN PATENT DOCUMENTS

| | | |
|---|---|---|
| CN | 1774699 A | 5/2006 |
| CN | 1945536 A | 4/2007 |

(Continued)

OTHER PUBLICATIONS

Notice of Allowance for U.S. Appl. No. 13/997,056, dated May 26, 2016, 14 pages.

(Continued)

*Primary Examiner* — Corey S Faherty
(74) *Attorney, Agent, or Firm* — Jordan IP Law, LLC

(57) ABSTRACT

Systems and methods may process a single atomic operation. An instruction set may be generated to replace a plurality of atomic operations with a single atomic operation. The instruction set may include an accumulation instruction to compute a prefix sum for a plurality of initial values associated with a plurality of processing lanes to generate a plurality of accumulated values. The instruction set may also include a broadcast instruction to return a pre-existing value to be added with each of the plurality of accumulated values to generate a plurality of intermediate accumulated values. In one example, a graphics processor may execute the instruction set to process the single atomic operation.

24 Claims, 14 Drawing Sheets

(56) References Cited

U.S. PATENT DOCUMENTS

| | | |
|---|---|---|
| 9,449,360 B2* | 9/2016 | Janczak ............... G06F 9/526 |
| 2005/0204119 A1 | 9/2005 | Saha |
| 2007/0294680 A1 | 12/2007 | Papakipos et al. |
| 2009/0070568 A1 | 3/2009 | Shi et al. |
| 2009/0240895 A1 | 9/2009 | Nyland et al. |
| 2010/0277486 A1 | 11/2010 | Bhoovaraghavan |
| 2011/0078226 A1 | 3/2011 | Baskaran et al. |
| 2012/0284701 A1 | 11/2012 | Tsai et al. |
| 2013/0132684 A1 | 5/2013 | Ostrovsky et al. |
| 2014/0198110 A1 | 7/2014 | Janczak et al. |

FOREIGN PATENT DOCUMENTS

| | | |
|---|---|---|
| CN | 101040272 A | 9/2007 |
| EP | 0244540 A2 | 11/1987 |
| WO | 2013/100928 A1 | 7/2013 |

OTHER PUBLICATIONS

Office Action for U.S. Appl. No. 13/997,056, dated Aug. 13, 2015, 20 pages.
European Search Report for EP Patent Application No. 11878802.5, dated Aug. 13, 2015, 7 pages.
International Search Report and Written Opinion received for PCT application No. PCT/US2011/067467, dated Jun. 25, 2012, 10 pages.
International Preliminary Report on Patentability and Written Opinion received for PCT Patent Application No. PCT/US2011/067467, dated Jul. 10, 2014, 7 pages.
Final Office Action for U.S. Appl. No. 13/997,056, dated Mar. 1, 2016, 19 pages.
Office Action for European Patent Application No. 11878802.5, dated Mar. 27, 2017, 5 pages.

* cited by examiner

HARDWARE INSTRUCTION SET TO REPLACE A PLURALITY OF ATOMIC OPERATIONS WITH A SINGLE ATOMIC OPERATION

BACKGROUND

Parallel processing may be implemented by a computer system to achieve faster execution of applications over traditional sequential processing. For example, single instruction multiple data (SIMD) is an example parallel process where a single instruction is performed simultaneously on multiple data. Accordingly, SIMD may help speed up data processing in applications including multimedia, video, audio encoding/decoding, 3-Dimensional (3-D) graphics and image processing. Program operations that access a same memory cell, however, may need to be synchronized to reduce unintended results such as data corruption if the program operations access the same memory cell in parallel. Thus, a plurality of atomic operations may be implemented, wherein a computing operation (e.g., read, modify, and write to a memory cell) is forced to be completed prior to execution of a subsequent computing operation.

A compiler may apply a process to execute a plurality of atomic operations. In a uniform source value operation where a destination address is uniform (e.g., all SIMD lanes write to the same address) and a source value is uniform (e.g., all SIMD lanes are writing the same value), the compiler generates instructions to determine a number of active SIMD lanes in an execution mask, to execute an atomic operation by multiplying the number of active lanes to a source value, and to propagate a return value to various lanes by maintaining a counter and right shifting the execution mask until it becomes 0. Thus, a value stored at the memory cell is changed after each of the atomic operations (e.g., adds) and a different return value is propagated to a corresponding lane after each of the atomic operations. In a non-uniform source value operation (e.g., SIMD lanes are not writing the same value), the compiler may apply an even more complex process to execute the atomic operations since calculations are more complex.

The compiler, however, generates a large number of instructions that may reduce performance of a parallel processing computing system. For example, the compiler may apply a process to generate a set of instructions that are executed in a loop. In a uniform source value operation where all lanes are enabled, the loop may execute for 8 (SIMD8), 16 (SIMD16) times, respectively, which amounts to about 98 (SIMD8)/98 (SIMD16) instructions being executed. Impact to performance becomes more dramatic in a non-uniform source value operation since the compiler generates even more instructions as a result of more complex calculations, wherein multiple loops (e.g., two loops) may be introduced that offset any gain. In addition, a number of instructions may increase as the number of SIMD lanes increases. For example, the compiler may generate about 710 (SIMD32) instructions in a non-uniform source value operation.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1A:
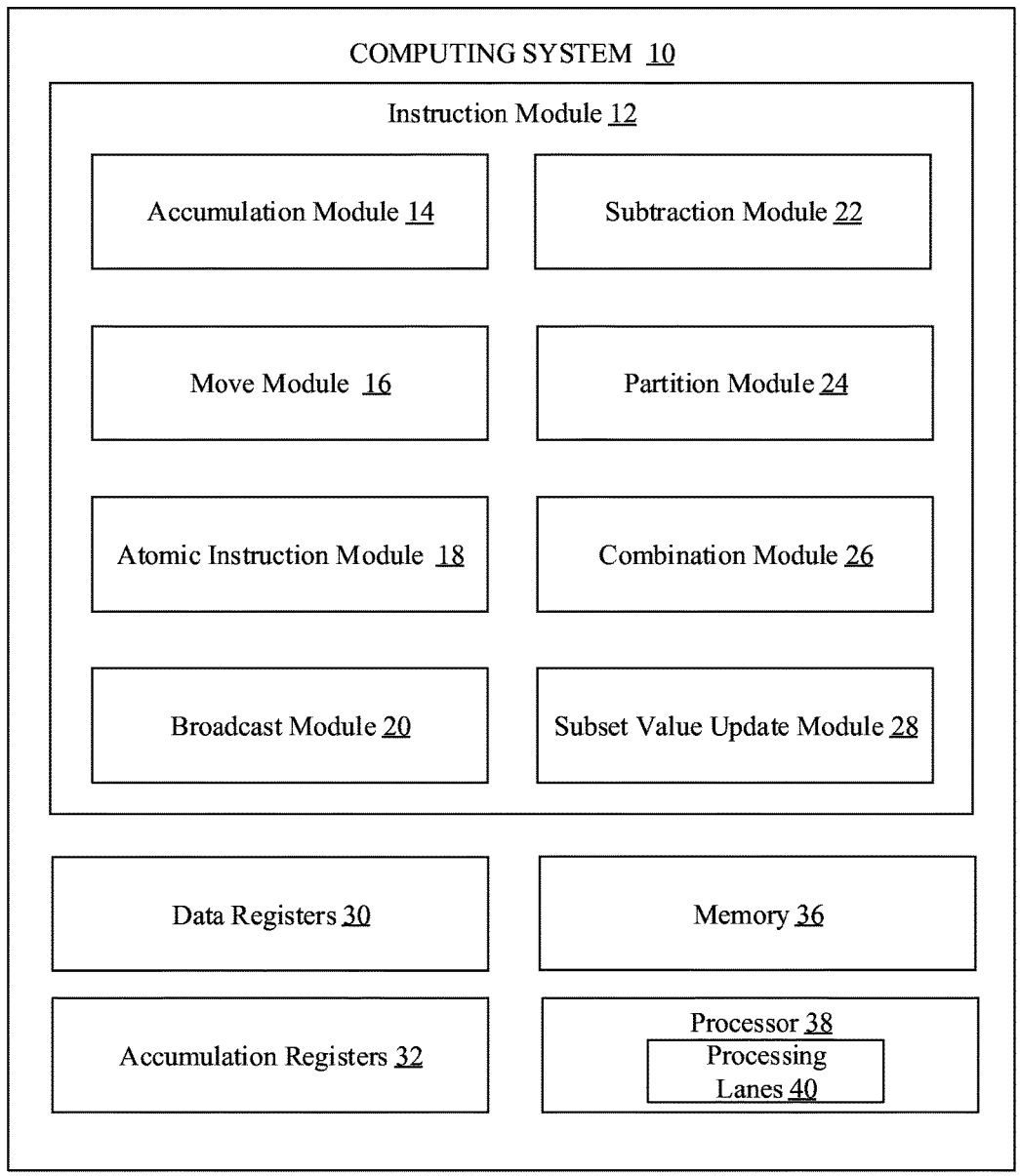
FIGS. 1A-1C are block diagrams of an example of a computing system according to an embodiment.
Figure 1B:
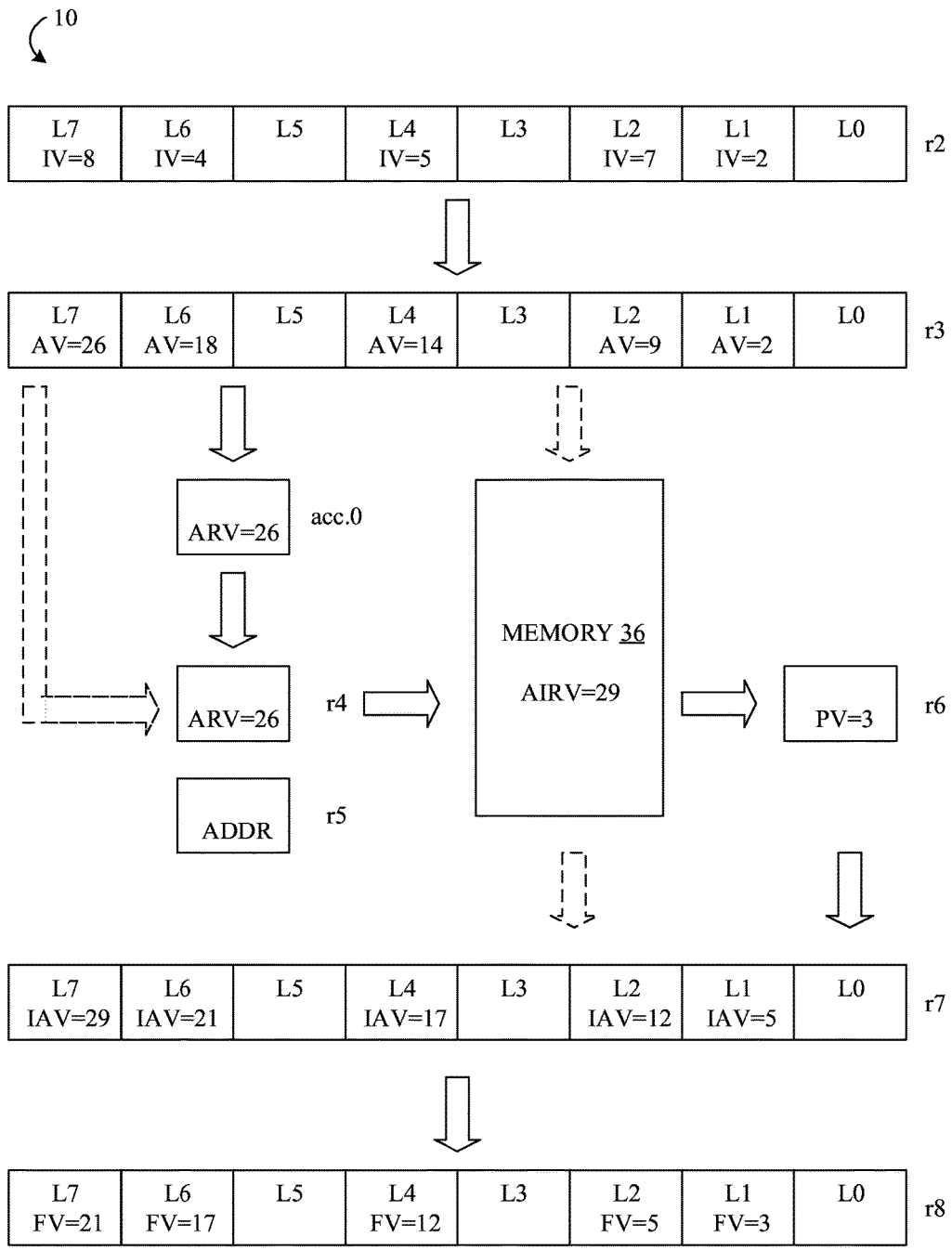
Figure 1C:
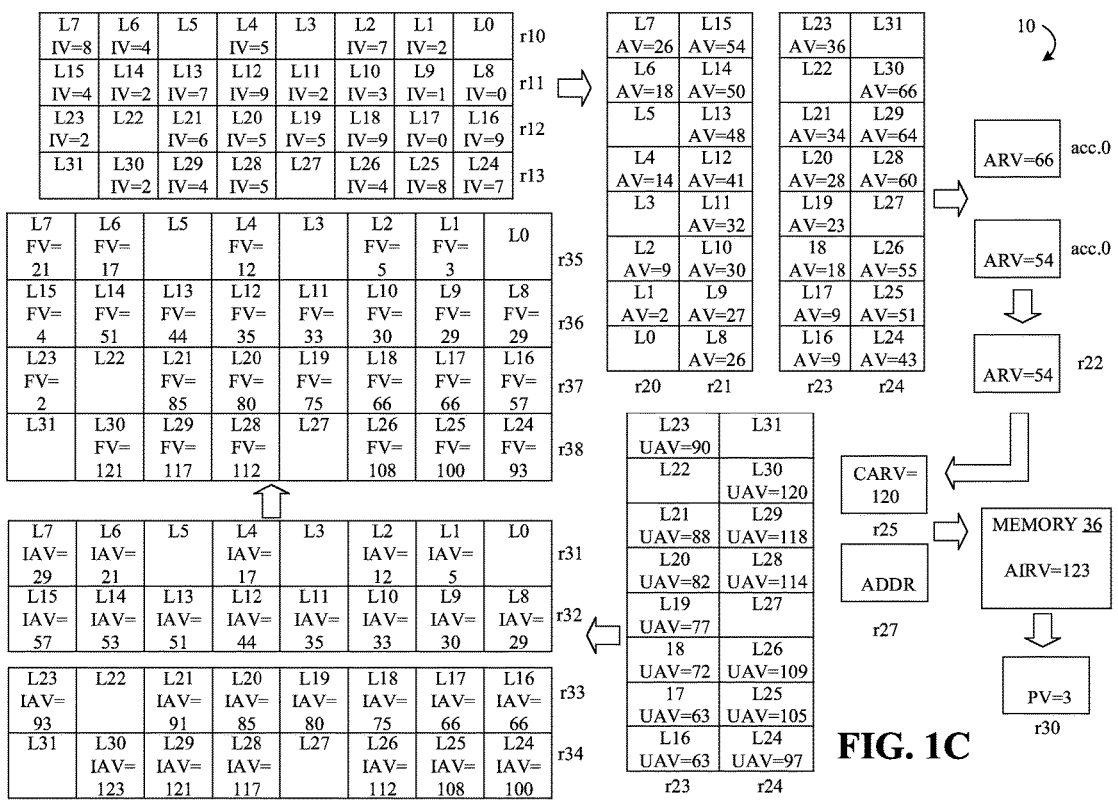

FIGS. 1A-1C show a computing system 10 which may include, for example, a desktop computer, notebook computer, tablet computer, convertible tablet, personal digital assistant (PDA), mobile Internet device (MID), media player, smart phone, smart televisions (TVs), radios, game console, wearable computer, server, etc., or any combination thereof. As illustrated in FIG. 1A, the computing system 10 includes an instruction module 12 that generates an instruction set which, when executed, replaces a plurality of atomic operations with a single atomic operation, discussed below.

The illustrated computing system 10 also includes one or more data registers 30, one or more accumulation registers 32, memory 36, and one or more processors 38 having one or more parallel processing lanes 40. The processors 38 may, for example, include a graphics processor with a single instruction multiple data (SIMD) architecture. In this case, the parallel processing lanes 40 may be SIMD lanes, wherein an OPENCL work-item, a CUDA thread, etc., may execute on a single SIMD lane. The computing system 10 may therefore support eight parallel processing lanes (SIMD8) on which eight corresponding work-items execute in parallel, sixteen parallel processing lanes (SIMD16) on which sixteen corresponding work-items execute in parallel, thirty-two parallel processing lanes (SIMD32) on which thirty-two corresponding work items execute in parallel, and so on. The computing system 10 may further include a compiler (e.g., just-in-time compiler) to apply the instruction module 12 and generate the instruction set in a hardware machine language, which may be executed by the processors 38.

The instruction module 12 may include an accumulation module 14 to generate an accumulation instruction which, when executed, computes a prefix sum for a plurality of initial values associated with the processing lanes 40, corresponding work-items, corresponding threads, etc., to generate a plurality of accumulated values. In addition, the instruction module 12 may include a move module 16 to generate a move instruction which, when executed, copies an accumulation result value (e.g., determined based on the plurality of accumulated values) from the accumulation register 32 to the data register 30 (e.g., a result register). In addition, the instruction module 12 may include an atomic instruction module 18 to generate an atomic instruction which, when executed, adds the accumulation result value with a pre-existing value in the memory 36 to generate an atomic instruction result value that replaces the pre-existing value in the memory 36.

In addition, the illustrated instruction module 12 may include a broadcast module 20 to generate a broadcast instruction which, when executed, returns the pre-existing value that is added with each of the plurality of accumulated values to generate a plurality of intermediate accumulated values. In addition, the instruction module 12 may include a subtraction module 22 to generate a subtract instruction which, when executed, subtracts between each of the plurality of initial values and each of the plurality of intermediate accumulated values to generate a plurality of final values.

As illustrated in FIGS. 1A and 1B, the data registers 30 (e.g., registers r2-r in FIG. 1B) and the accumulation registers 32 (e.g., register acc.0 in FIG. 1B) hold data involved in an atomic operation (e.g., atomic add). For example, the register r2 may be partitioned into a plurality of columns (e.g., row 2, columns 0-7), wherein each column may hold one of a plurality of initial values "2, 7, 5, 4, 8" that are associated with the processing lanes 40 (L1, L2, L4, L6, L7), corresponding work-items, corresponding threads, etc. It should be understood that the lanes L0-L7 are identified for illustration, and that only the initial values "2, 7, 5, 4, 8" are held in the register r2. In addition, the lanes L0 and L5 are disabled, and the register r2 may not hold an initial value associated with the disabled lanes L0 and L5 (e.g., "0").

The accumulation module 14 may generate an accumulation instruction that computes a prefix sum for the initial values "2, 7, 5, 4, 8" to generate a plurality of accumulated values "2, 9, 14, 18, 26", which are stored in the register r3. For example, the illustrated lane L1 sums the initial value "2" with an initial value associated with L0 (e.g., "0") and the resulting accumulated value "2" is stored in the register r3. Similarly, the illustrated lane L2 sums the initial value "7" with the initial value "2" associated with the lane L1 and the initial value "0" associated with the lane L0, wherein the resulting accumulated value "9" is stored in the register r3. Thus, the initial values "0, 2, 7, 0, 5" are summed and the resulting accumulated value "14" is stored in the register r3, the initial values "0, 2, 7, 0, 5, 0, 4" are summed and the resulting accumulated value "18" is stored in the register r3, and the initial values "0, 2, 7, 0, 5, 0, 4, 8" are summed and the resulting accumulated value "26" is stored in the register r3. In one example, the prefix sum may be applied only to enabled lanes L1, L2, L4, L6, L7, and may skip the disabled lanes L3 and L5.

The accumulation instruction may cause the accumulation value "26" (e.g., a final accumulated value, maximum value) to be written to the accumulation register acc.0. In this case, the move module 16 may generate a move instruction that copies an accumulation result value "26", based on the plurality of accumulated values (e.g., a final accumulated value, maximum value), from the accumulation register acc.0 to the register r4. Moreover, the atomic instruction module 18 may generate an atomic instruction that adds the accumulation result value "26" with a pre-existing value "3", stored in a cell of the memory 36, to generate an atomic instruction result value "29" that replaces the pre-existing value "3" in the memory 36. In another example, the atomic instruction module 18 may generate an atomic instruction that adds the accumulation value "26" from the register r3 or the accumulation result value "26" from the accumulation register acc.0 with the pre-existing value "3" stored in the memory cell. The memory location address ADDR that is involved in the atomic operation may be determined from the register r5.

The broadcast module 20 may generate a broadcast instruction that returns the pre-existing value "3". The pre-existing value "3" is then added with each of the plurality of accumulated values "2, 9, 14, 18, 26" to generate a plurality of intermediate accumulated values "5, 12, 17, 21, 29", which are stored in the register r7. In one example, the broadcast instruction may return the pre-existing value "3" from the register r6. In another example, the broadcast instruction may return the pre-existing value "3" from the cell in the memory 36. The subtraction module 22 may generate a subtract instruction that subtracts between each of the plurality of initial values "2, 7, 5, 4, 8" and each of the plurality of intermediate accumulated values "5, 12, 17, 21, 29" to generate a plurality of final values "3, 5, 12, 17, 21", which are stored in the register r8.

Accordingly, an instruction set may be generated to replace a plurality of atomic operations with a single atomic operation. Notably, rather than adding a plurality of values sequentially in a cell of the memory 36 via a plurality of atomic operations (e.g., sequentially adding values "2, 7, 5, 4, 8"), a single atomic operation may be performed that adds a maximum value of a prefix sum (e.g., value "26") to the cell of the memory 36. In addition, rather than propagating a different value to a corresponding lane after each of the plurality of atomic operations (e.g., value "3", then value "5", then value "12", etc.), the same return value (e.g., pre-existing value "3") may be propagated to each active lane L1, L2, L4, L6, L7 after the single atomic operation. Thus, complexity is reduced and a performance gain from the atomic operation is substantially maintained.

The following code may be applied by a compiler to generate an instruction set that includes a same number of instructions for a uniform source value operation and a non-uniform source value operation, only about 5 instructions, and no loops.

suma <dstReg><srcVal>; Accumulator gets the max value
mov <finalVal><acc>
<returnVal>=atomic_add <dstAddr><finalVal>
add <accumulated_reg><dstReg><returnVal>
add <m_destination><accumulated_reg>-<srcVal>

In one particular example, the following instruction set may be generated and/or executed for an SIMD8 implementation:

1) suma (8) r3.0<1>:d r2.0<1>:d {Align1, H1}
2) mov (1) r4.0<1>:d acc.0 {Align1, H1, NoMask}
3) sends (1) r6.0<1>:d r5 r4 0x4c 0x20097fe:ud {Align1, Q1, NoMask}
4) add (8) r7.0<1>:d r3.0<8;8,1>:d r6.0<0;0,1>:d
5) add (8) r8.0<1>:d r7.0<8;8,1>-r2.0<8;8,1>:d {Align1, H1}

The illustrated hardware instruction in line 1) performs a prefix sum to add all enabled lane values and obtain a final value. Rather than executing an SIMD8 atomic instruction, we are executing a SIMD1 atomic instruction. Thus, for example, given an initial state in the register r2.0 with three disabled lanes, the following result is provided in the register r3.0 when the suma instruction is executed: Lane 1=Lane 1+Lane 0 (Disabled)=2; Lane 2=Lane 2+Lane 1=7+2=9; Lane 3=Disabled; Lane 4=Lane 0+Lane 1+Lane 2+Lane 3+Lane 4=0+2+7+0+5=14; Lane 5=Disabled; Lane 6=Lane 0+Lane 1+Lane 2+Lane 3+Lane 4+Lane 5+Lane 6=0+2+7+0+5+0+4=18; Lane 7=Lane 0+Lane 1+Lane 2+Lane 3+Lane 4+Lane 5+Lane 6+Lane 7=0+2+7+0+5+0+4+8=26. Also an assignment may occur with the suma instruction, wherein the final value in lane 7 (e.g., "26") is written to the accumulation register acc.0.

The illustrated hardware instruction in line 2) executes when an accumulation register cannot be used in send instructions. In this case, the accumulation register acc.0 is copied to the register r4.0. The illustrated hardware instruction in line 3) implements the SIMD1 instruction (e.g., atomic operation). The register r4.0 contains the final value to be written to the destination address. The register r5.0 has the destination address. It should be understood that atomic instructions also have the ability to return the previous value contained in the memory location if the application requires it. The register r6.0 contains the return value from the atomic operation. In one example, where there is a value of "3" at a memory location that is being written, the value of "3" is returned.

Since the register r6.0 receives the return value of "3", that value is to be returned to all the other lanes and added with their previous values. Thus, the illustrated hardware instruction in line 4) adds the register r6.0 with the register r3.0, which contains the accumulated prefix sum, and is written to the register r7.0. In this case, register r7.0=register r6.0+register r3.0="3"+register r3.0. Finally, the illustrated hardware instruction in line 5) subtracts between the initial value and the accumulated value to obtain the correct results that should have been returned from the atomic operation. For example, the register r8.0=register r7.0+(−register r2.0), wherein a subtraction is implemented by adding a negative of an initial value with a positive of an accumulated value.

It should be understood that the code is for illustration, and different code may be generated and/or executed for a desired outcome. For example, the hardware instruction for line 5) may subtract, e.g., two positive values, for a same outcome. In this case, the code subb (8) r8.0<1>:d r7.0<8; 8,1>r2.0<8;8,1>:d {Align1, H1} may be implemented by a compiler, and the hardware instruction subb (8) r8.0<1>: d r7.0<8;8,1>r2.0<8;8,1>:d {Align1, H1} may be generated and/or executed to subtract. In addition, both uniform operations and non-uniform operations may have the same number of instructions generated and executed. Moreover, loops may be eliminated and the code size generated by the compiler may be much smaller (e.g., from 21 instructions to 5 instructions). In a worst case when all channels are enabled, for SIMD8 and SIMD16, the instructions executed would reduce from 98 instructions to 5 instructions.

As illustrated in FIG. 1A, the instruction module 12 may also include a partition module 24 to generate a partition instruction which, when executed, logically partitions the processing lanes 40, corresponding work-items, corresponding threads, etc., into two or more subsets. For example, the partition module 24 may partition a plurality of thirty-two lanes into two halves including an upper half of lanes (e.g., first subset) and a lower half of lanes (e.g., second subset). In this case, the accumulation module 14 may generate a first accumulation instruction for a plurality of first initial values associated with the first subset of the plurality of processing lanes to generate a plurality of first accumulated values. Also, the accumulation module 14 may generate a second accumulation instruction for a plurality of second initial values associated with a second subset of the plurality of processing lanes to generate a plurality of second accumulated values.

In addition, the instruction module 12 may include a combination module 26 to generate a combination instruction which, when executed, adds a first accumulation result value (e.g., based on the plurality of first accumulated values) with a second accumulation result value (e.g., based on the plurality of second accumulated values) to generate a combined accumulation result value. In addition, the instruction module 12 may include a subset value update module 28 to generate an update instruction which, when executed, adds the first accumulation result value with each of the plurality of second accumulated values to generate a plurality of updated accumulated values.

The atomic instruction module 18 may generate an atomic instruction which, when executed, adds the combined accumulation result value with the pre-existing value to generate the atomic instruction result value that is to replace the pre-existing value in the memory 36. Moreover, the broadcast module 20 may generate a first broadcast instruction to return the pre-existing value to be added with each of the plurality of first accumulated values to generate a plurality of first intermediate accumulated values. Also, the broadcast module 20 may generate a second broadcast instruction to return the pre-existing value to be added with each of the plurality of updated accumulated values to generate a plurality of second intermediate accumulated values.

The subtraction module 22 may generate a first subtract instruction which, when executed, subtracts between each of the plurality of first initial values and each of the plurality of first intermediate accumulated values. Also, the subtraction module 22 may generate a second subtract instruction to subtract between each of the plurality of second initial values and each of the plurality of second intermediate accumulated values to generate the plurality of final values associated with the plurality of processing lanes.

As illustrated in FIGS. 1A and 1C, the data registers 30 (e.g. registers r10-r13, r20-r25, r27, r30-r38 in FIG. 1C) and the accumulation registers 32 (e.g., registers acc.0 in FIG. 1C) hold data involved in an atomic operation. In one example, the register r10 may be partitioned into a plurality of columns (e.g., row 10, columns 0-7), wherein each column may hold one of a plurality of initial values "2, 7, 5, 4, 8" that are associated with the processing lanes 40 (L1, L2, L4, L6, L7), corresponding work-items, corresponding threads, etc. It should be understood that the lanes L0-L7 are identified for illustration, and that only the initial values "2, 7, 5, 4, 8" are held in the register r10. In addition, the lanes L0 and L5 are disabled, and the register r10 may not hold an initial value associated with the disabled lanes L0 and L5 (e.g., "0").

The partition module 24 may generate a partition instruction that logically partitions the lanes L0-L31, corresponding work-items, corresponding threads, etc., into two or more subsets. For example, the partition module 24 may partition the lanes L0-L31 into two halves including an upper half of lanes L0-L15 (e.g., first subset) and a lower half of lanes L16-L31 (e.g., second subset). In this case, the accumulation module 14 may generate a first accumulation instruction for the first initial values "2, 7, 5, 4, 8, 0, 1, 3, 2, 9, 7, 2, 4" associated with the first subset L0-L15 to generate a plurality of first accumulated values "2, 9, 14, 18, 26, 26, 27, 30, 32, 41, 48, 50, 54", which are stored in the registers r20, r21. Also, the accumulation module 14 may generate a second accumulation instruction for a plurality of second initial values "9, 0, 9, 5, 5, 6, 2, 7, 8, 4, 5, 4, 2" associated with the second subset L16-L31 to generate a plurality of second accumulated values "9, 9, 18, 23, 28, 34, 36, 43, 51, 55, 60, 64, 66", which are stored in the registers r23, r24.

The first accumulation instruction may cause the accumulation value "54" (e.g., a final accumulated value, maximum value) to be written to a first accumulation register acc.0. Similarly, the second accumulation instruction may cause the accumulation value "66" (e.g., a final accumulated value, maximum value) to be written to a second accumulation register acc.0. In this case, the move module 16 may generate a move instruction to copy a first accumulation result value "54" from the register acc.0 for the upper half to the register r22. Moreover, the combination module 26 may generate a combination instruction that adds the first accumulation result value "54" in the register r22 with the second accumulation result value "66" in the second accumulation register acc.0 to generate a combined accumulation result value "120", which is stored in the register r25. Also, the subset value update module 28 may generate an update instruction that adds the first accumulation result value "120" with each of the plurality of second accumulated values "9, 9, 18, 23, 28, 34, 36, 43, 51, 55, 60, 64, 66" to generate a plurality of updated accumulated values "63, 63, 72, 77, 82, 88, 90, 97, 105, 109, 114, 118, 120", which are stored in the registers r23, r24.

In addition, the atomic instruction module 18 may generate an atomic instruction that adds the combined accumulation result value "120" with a pre-existing value "3", stored in a cell of the memory 36, to generate an atomic instruction result value "123" that replaces the pre-existing value "3" in the memory 36. Moreover, the broadcast module 20 may generate a first broadcast instruction that returns the pre-existing value "3" that is added with each of the plurality of first accumulated values "2, 9, 14, 18, 26, 26, 27, 30, 32, 41, 48, 50, 54" to generate a plurality of first intermediate accumulated values "5, 12, 17, 21, 29, 29, 30, 33, 35, 44, 51, 53, 57", which are stored in the registers r31, r32. Also, the broadcast module 20 may generate a second broadcast instruction to return the pre-existing value "3" that is added with each of the plurality of updated accumulated values "63, 63, 72, 77, 82, 88, 90, 97, 105, 109, 114, 118, 120" to generate a plurality of second intermediate accumulated values "66, 66, 75, 80, 85, 91, 93, 100, 108, 112, 117, 121, 123", which are stored in the registers r33, r34. In one example, the broadcast instruction returns the pre-existing value 3 from the register r30.

In addition, the subtraction module 22 may generate a first subtract instruction that subtracts between each of the plurality of first initial values "2, 7, 5, 4, 8, 0, 1, 3, 2, 9, 7, 2, 4" and each of the plurality of first intermediate accumulated values "5, 12, 17, 21, 29, 29, 30, 33, 35, 44, 51, 53, 57". In one example, the first subtract instruction adds a negative of each of the plurality of first initial values "2, 7, 5, 4, 8, 0, 1, 3, 2, 9, 7, 2, 4" with each of the plurality of first intermediate accumulated values "5, 12, 17, 21, 29, 29, 30, 33, 35, 44, 51, 53, 57". Also, the subtraction module 22 may generate a second subtract instruction that subtracts between each of the plurality of second initial values "9, 0, 9, 5, 5, 6, 2, 7, 8, 4, 5, 4, 2" and each of the plurality of second intermediate accumulated values "66, 66, 75, 80, 85, 91, 93, 100, 108, 112, 117, 121, 123". In one example, the second subtract instruction adds a negative of each of the plurality of second initial values "9, 0, 9, 5, 5, 6, 2, 7, 8, 4, 5, 4, 2" with each of the plurality of second intermediate accumulated values "66, 66, 75, 80, 85, 91, 93, 100, 108, 112, 117, 121, 123". Thus, a plurality of final values "3, 5, 12, 17, 21, 29, 29, 30, 33, 35, 44, 51, 4, 57, 66, 66, 75, 80, 85, 2, 93, 100, 108, 112, 117, 121" may be generated that are associated with the lanes L0-L31, corresponding work-items, corresponding threads, etc., and which are stored in the registers r35-r38.

Accordingly, an SIMD32 implementation may be an extension of an SIMD8 implementation, wherein thirty-two work items are launched at the same time rather than eight work-items. If SIMD32 instructions are not supported, two SIMD16 instructions may be used. This behavior may be emulated using H1 and H2 code, which indicates upper 16 work-items and lower 16 work-items, respectively.

In one particular example, the following instruction set may be generated and/or executed for an SIMD32 implementation:

(1) suma (16) r20.0<1>:d r10.0<8;8,1>:d {Align1, H1}
(2) mov (1) r22.0<1>:d acc.0 {Align1, H1, NoMask}
(3) suma (16) r23.0<1>:d r12.0<8;8,1>:d {Align1, H2}
(4) add (1) r25.0<1>:d r22.0<1>:d acc.0 {Align1, H}
(5) add (16) r23.0<1>:d r23.0<8;8,1>:d r22.0<0;0,1>:d {Align1, H2}
(6) sends (1) r30.0<1>:d r27 r25 0x4c 0x20097fe: ud{Align1, Q1, NoMask}///#??:$2580//untyped atomic operation, resp length=0, msg length=1, ext msg length=1, barrier
(7) add (16) r31.0<1>:d r20.0<8;8,1>:d r30.0<0;1,0>:d {Align1, H1}
(8) add (16) r33.0<1>:d r23.0<8;8,1>:d r30.0<0;1,0>:d {Align1, H2}
(9) add (16) r35.0<1>:d r31.0<8;8,1>:d -r10.0<8;8,1>:d {Align1, H1}
(10) add (16) r37.0<1>:d r33.0<8;8,1>:d -r12.0<8;8,1>:d {Align1, H2}

Similar to the SIMD8 instruction sequence, 2 equivalent SIMD16 instructions may be generated in SIMD32. In this case, the illustrated hardware instruction in line (1) operates on the upper half of the SIMD32 registers (e.g., registers r10, r11). The accumulation occurs on the registers r10, r11, wherein the H1 indicates that the upper half is being accumulated. The result is stored in the registers r20, r21. In addition, a first accumulation register acc.0 receives the value "54", which is the final accumulated value for the upper half. The illustrated hardware instruction in line (2) moves the value "54" in the register acc.0 to the register r22. The illustrated hardware instruction in line (3) (e.g., second suma instruction) operates on the lower half of the SIMD32 registers (e.g., registers r12, r13). Thus, an accumulation is performed of the registers r12, r13. The result is stored in the registers r23, r24. In addition, a second accumulation register acc.0 receives the value "66", which is the final accumulated value for the lower half.

The illustrated hardware instruction in line (4) adds the value "66" in the accumulation register acc.0 of the lower half with the value "54" in the register r22. Thus, r25 receives a combined value of 54+66=120, which is the value to be written in the single atomic operation. In addition, the illustrated hardware instruction in line (5) adds the value "54" in the accumulation register acc.0 for the upper half to the lower lanes (e.g., registers r23, r24). The illustrated hardware instruction in line (6) implements the SIMD1 instruction (e.g., atomic operation). In this case, the register r25 holds the source value to be written (e.g., "120"). The register r27 contains the destination address ADDR and the register r30 becomes the return value (e.g., "3") from the atomic operation.

The illustrated hardware instruction in line (7) adds the atomic operation result (e.g., "3") to every lane for the upper half (e.g., the registers r20, r21 with the accumulated values), which are stored in the registers r31, r32. The illustrated hardware instruction in line (8) adds the atomic operation result (e.g., "3") to every lane for the lower half (e.g., the registers r23, r24 with the updated accumulated values), which are stored in the registers r33, r34. The illustrated hardware instructions in lines (9) and (10) subtract between the upper half and the lower half of the accumulated registers r31-r34 and the initial values (e.g., original values) of the registers r11-r12, respectively, and the registers r35-r38 store final values. For example, the register r35=register r31+(−register r11), wherein a subtraction is implemented by adding a negative of an initial value with a positive of an intermediate accumulated value.

It should be understood that the code is for illustration, and different code may be generated and/or executed for a desired outcome. For example, the hardware instruction for lines (9) and (10) may subtract, e.g., two positive values, for a same outcome. In this case, the hardware instruction subb (16) r35.0<1>:d r31.0<8;8,1>:d r10.0<8;8,1>:d {Align1, H1} and/or subb (16) r37.0<1>:d r33.0<8;8,1>:d r12.0<8; 8,1>:d {Align1, H2} may be generated and/or executed to subtract. In addition, in a SIMD32 implementation, a suma is performed on H1, and the maximum value from it is added it to the general resource file (GRF) H2. A second suma is then performed on H2 and the final value from there is used for the final atomic instruction. Accordingly, a SIMD32 implementation will see a reduction from about 724 instructions to about 10 instructions. Moreover, the code may be independent of the execution mask size. Thus, there may not be a large jump in the linear growth when scalar atomic instructions are present in nested control flow. In addition, instruction cache size may be maintained since the code that is generated is much smaller.

Figure 2:
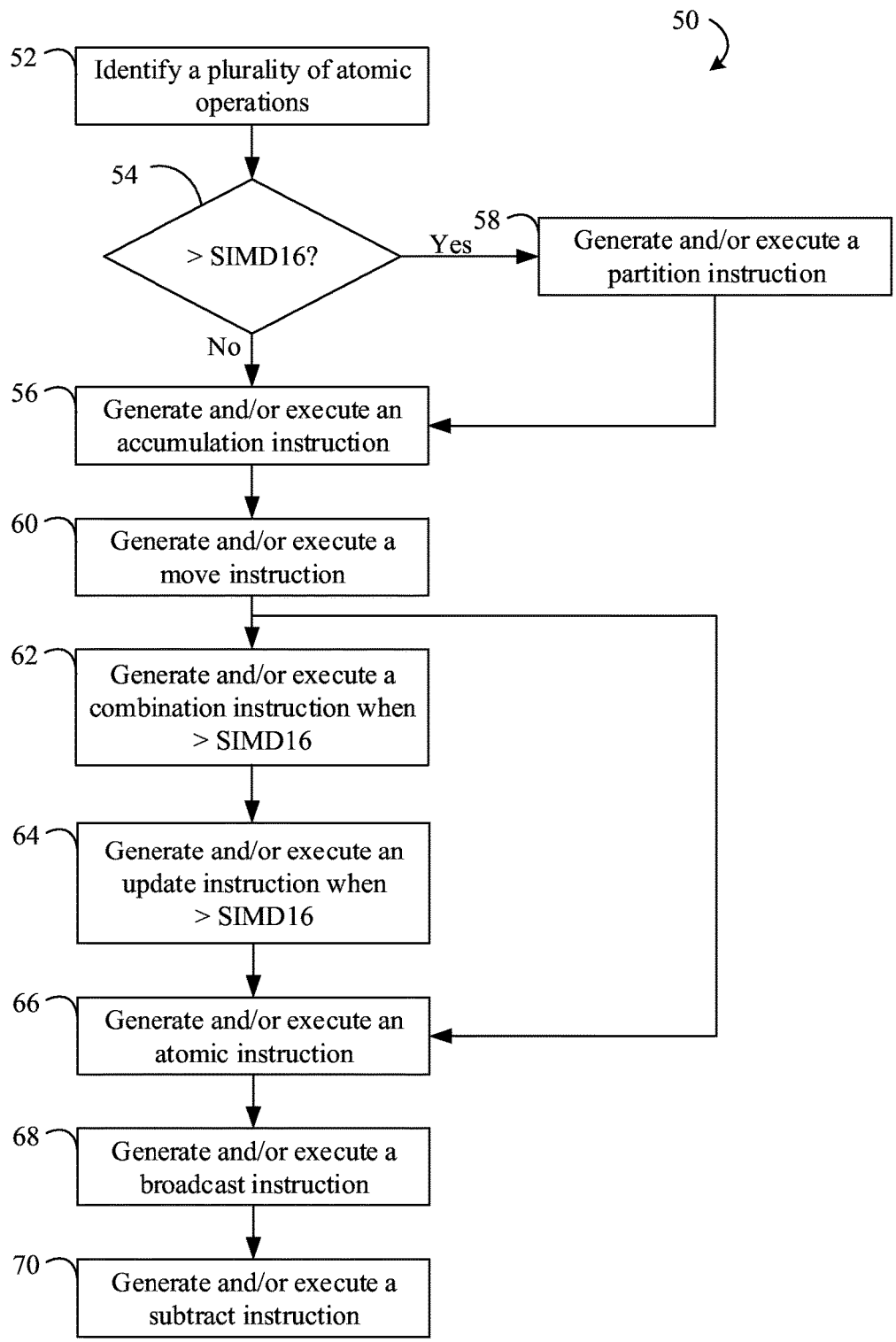
FIG. 2 is a flowchart of an example of a method to generate and/or execute an instruction set according to an embodiment.

FIG. 2 shows a method 50 of generating and/or executing an instruction set to replace a plurality of atomic operations with a single atomic operation. The method 50 may be implemented in one or more modules as a set of logic instructions stored in a machine- or computer-readable storage medium such as random access memory (RAM), read only memory (ROM), programmable ROM (PROM), flash memory, etc., as configurable logic such as, for example, programmable logic arrays (PLAs), field programmable gate arrays (FPGAs), complex programmable logic devices (CPLDs), as fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 50 may be written in any combination of one or more programming languages, including an object oriented programming language such as C++ or the like and conventional procedural programming languages, such as the "C" programming language or similar programming languages for graphics such as the High Level Shader Language (HLSL) (by Microsoft DirectX®), the OpenGL Shading Language (GLSL) (by OpenGL®), or the Open Computing Language (OpenCL™). Moreover, in some implementations, various aspects of the method 50 could be implemented as embedded logic of a graphic driver using any of the aforementioned circuit technologies.

Illustrated processing block 52 provides for identifying a plurality of atomic operations. For example, a parallel process that requires access to the same cell in memory may be identified. In another example, a uniform source value operation may be identified. In a further example, a non-uniform source value operation may be identified. Thus, the processing block 52 may identify a plurality of atomic operations that involve a series of atomic adds to the memory. A determination may be made at block 54 whether the plurality of atomic operations involve more than sixteen parallel processing lanes (e.g., >SIMD16), corresponding work-items, threads, etc. It should be understood that a determination may also be made at the block 54 whether the plurality of atomic operations involves less than or equal to sixteen parallel processing lanes, a specific number of parallel processing lanes (e.g., SIMD8, SIMD16, SIMD32, etc.), and so on.

If the plurality of atomic operations do not involve more than sixteen parallel processing lanes, illustrated processing block 56 may generate and/or execute an accumulation instruction to compute a prefix sum for a plurality of initial values associated with the plurality of processing lanes to generate a plurality of accumulated values. If the plurality of atomic operations involve more than sixteen parallel processing lanes, illustrated processing block 58 may generate and/or execute a partition instruction to logically partition the plurality of processing lanes, corresponding work-items, corresponding threads, etc., into two or more subsets. Where two subsets are generated, for example, the processing block 56 may generate and/or execute a first accumulation instruction for a plurality of first initial values associated with a first subset of the plurality of processing lanes to generate a plurality of first accumulated values, and a second accumulation instruction for a plurality of second initial values associated with a second subset of the plurality of processing lanes to generate a plurality of second accumulated values.

If the plurality of atomic operations do not involve more than sixteen parallel processing lanes, illustrated processing block 60 may generate and/or execute a move instruction to copy an accumulation result value (e.g., based on the plurality of accumulated values) from an accumulation register to a result register. If the plurality of atomic operations involve more than sixteen parallel processing lanes, the processing block 60 may generate and/or execute a move instruction to copy a first accumulation result value (e.g., based on the plurality of first accumulated values) from a first accumulation register to a result register. In addition, illustrated processing block 62 may generate a combination instruction to add the first accumulation result value (e.g., from the result register) with a second accumulation result value (e.g., based on the plurality of second accumulated values) that is stored (e.g., in a second accumulation register) to generate a combined accumulation result value. Moreover, illustrated processing block 64 may generate an update instruction to add the first accumulation result value (e.g., from the result register) with each of the plurality of second accumulated values to generate a plurality of updated accumulated values.

If the plurality of atomic operations do not involve more than sixteen parallel processing lanes, illustrated processing block 66 may generate and/or execute an atomic instruction to add the accumulation result value with the pre-existing value to generate an atomic instruction result value that replaces the pre-existing value in memory. If the plurality of atomic operations involve more than sixteen parallel processing lanes, the processing block 66 may generate and/or execute an atomic instruction to add the combined accumulation result value with the pre-existing value to generate the atomic instruction result value that replaces the pre-existing value in the memory.

If the plurality of atomic operations do not involve more than sixteen parallel processing lanes, illustrated processing block 68 may generate and/or execute a broadcast instruction to return a pre-existing value that is added with each of the plurality of accumulated values to generate a plurality of intermediate accumulated values. If the plurality of atomic operations involve more than sixteen parallel processing lanes, the processing block 68 may generate and/or execute a first broadcast instruction to return the pre-existing value that is added with each of the plurality of first accumulated values to generate a plurality of first intermediate accumulated values, and a second broadcast instruction to return the pre-existing value that is added with each of the plurality of updated accumulated values to generate a plurality of second intermediate accumulated values.

If the plurality of atomic operations do not involve more than sixteen parallel processing lanes, illustrated processing block 70 may generate and/or execute a subtract instruction to subtract between each of the plurality of initial values and each of the plurality of intermediate accumulated values to generate a plurality of final values associated with the plurality of processing lanes. If the plurality of atomic operations involve more than sixteen parallel processing lanes, the processing block 70 may generate and/or execute a first subtract instruction to subtract between each of the plurality of first initial values and each of the plurality of first intermediate accumulated values, and a second subtract instruction to subtract between each of the plurality of second initial values and each of the plurality of second intermediate accumulated values to generate the plurality of final values associated with the plurality of processing lanes.

Figure 3:
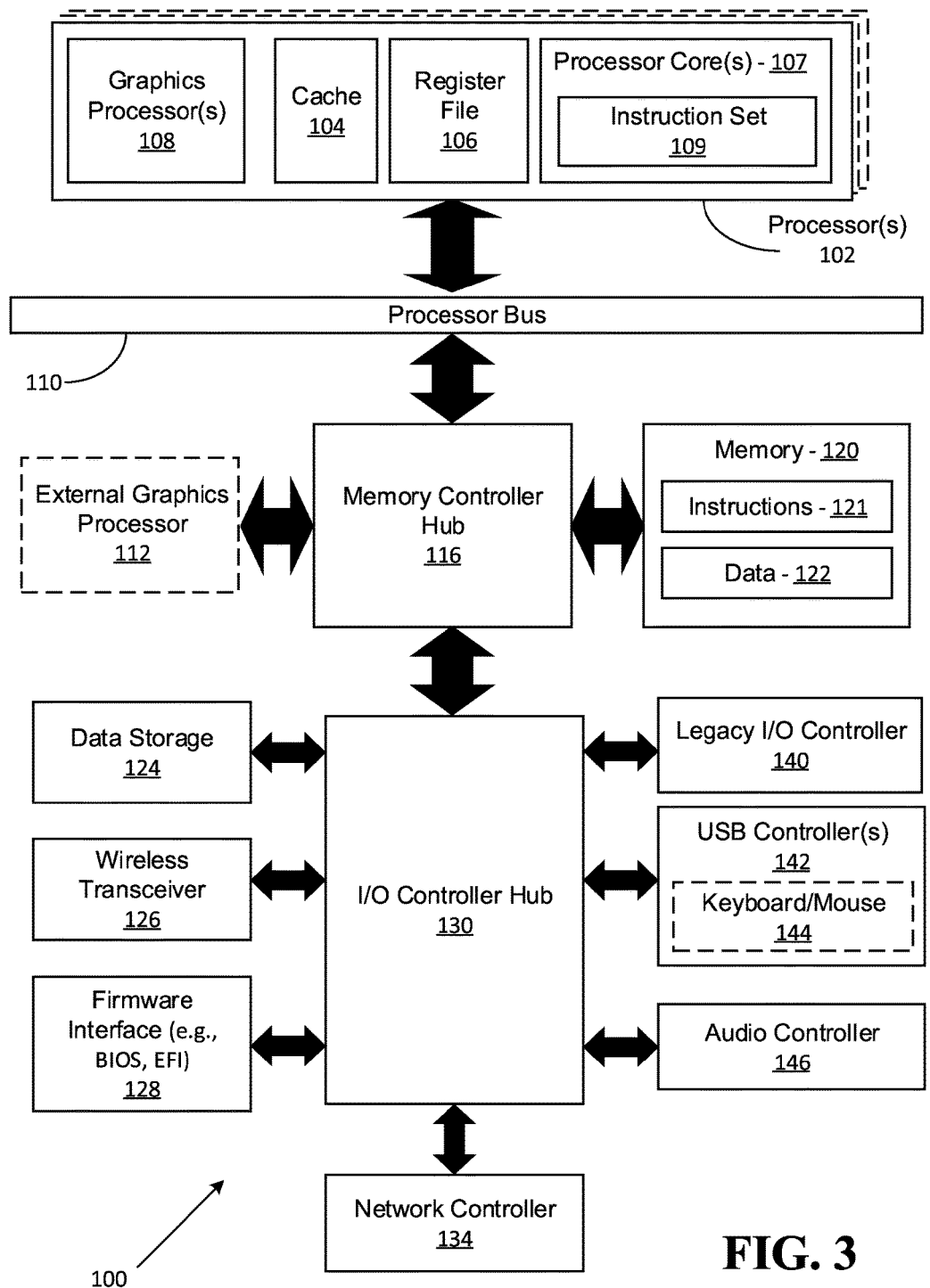
FIGS. 3-5 are block diagrams of an example of an overview of a data processing system according to an embodiment.
Figure 4:
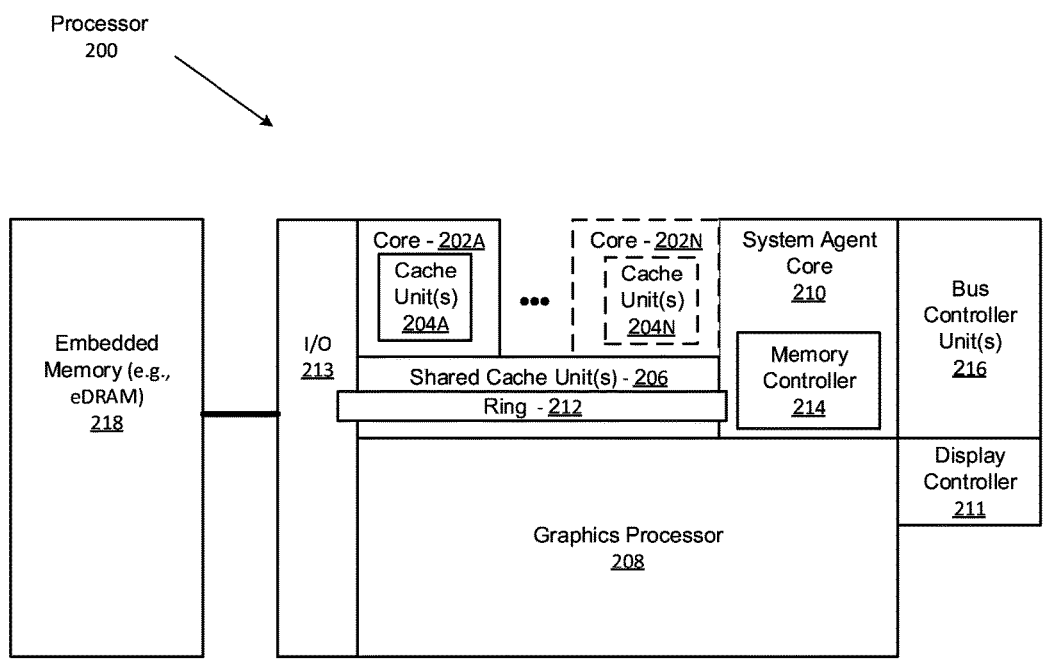
Figure 5:
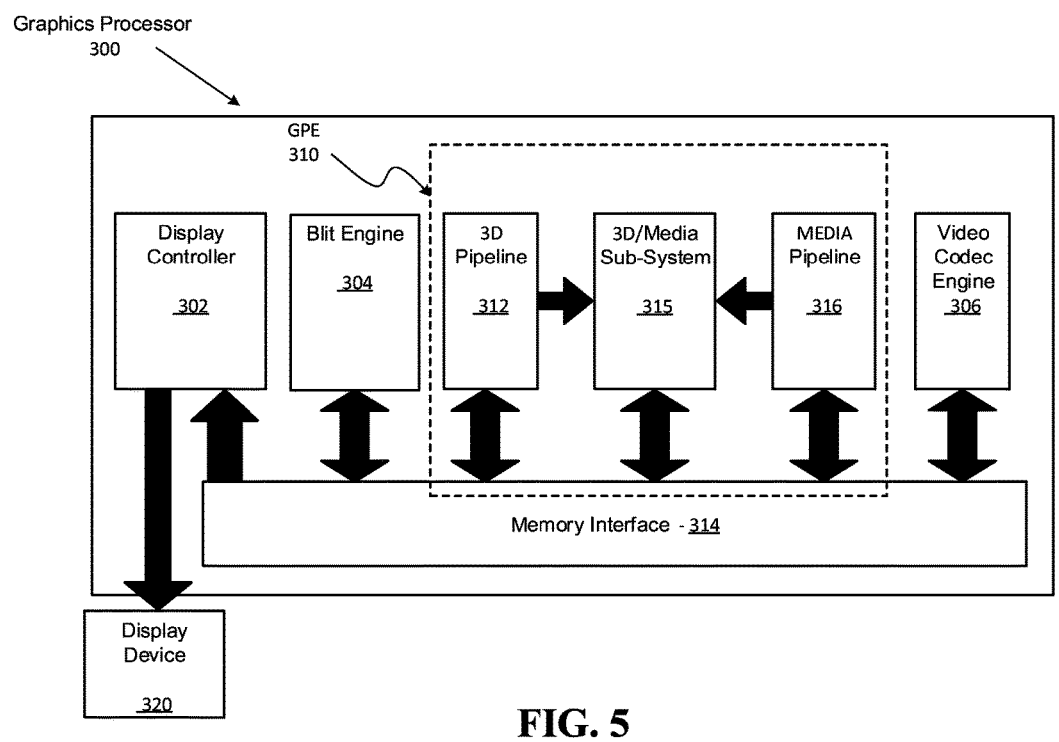

Overview—FIGS. 3-5

FIG. 3 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In one embodiment, the data processing system 100 is a system on a chip (SOC) integrated circuit for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processors 108 in the processors 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

FIG. 4 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units 216 manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be a separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

FIG. 5 is a block diagram of one embodiment of a graphics processor 300 which may be a discrete graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 6:
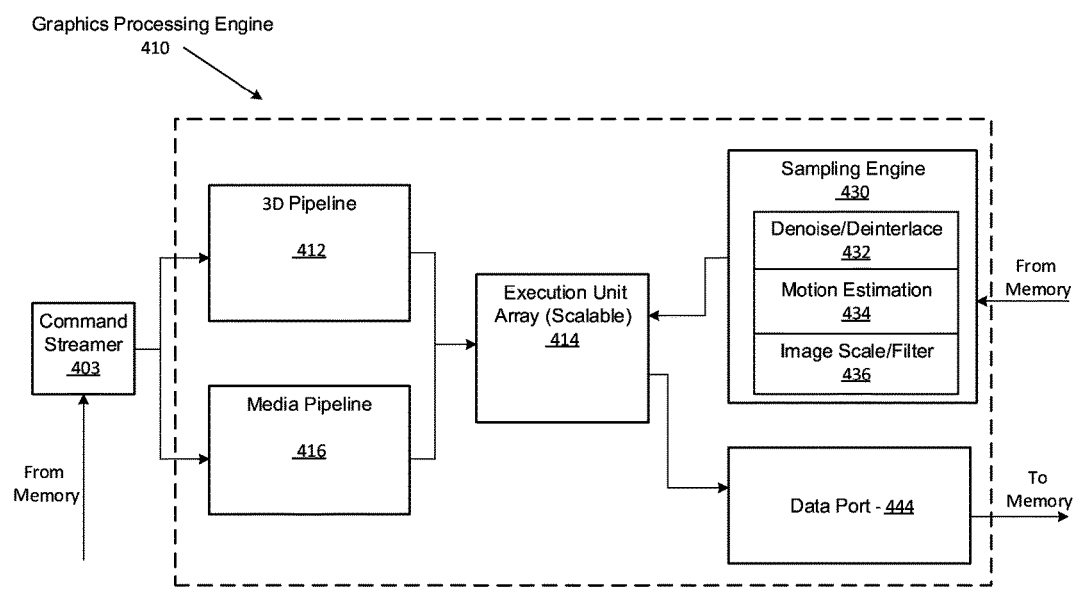
FIG. 6 is a block diagram of an example of a graphics processing engine according to an embodiment.

3D/Media Processing—FIG. 6

FIG. 6 is a block diagram of an embodiment of a graphics processing engine 410 for a graphics processor. In one embodiment, the graphics processing engine (GPE) 410 is a version of the GPE 310 shown in FIG. 5. The GPE 410 includes a 3D pipeline 412 and a media pipeline 416, each of which can be either different from or similar to the implementations of the 3D pipeline 312 and the media pipeline 316 of FIG. 5.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution unit array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single frame of video. The de-noise logic reduces or removes data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the subsystems of the graphics processing engine 410.

Figure 7:
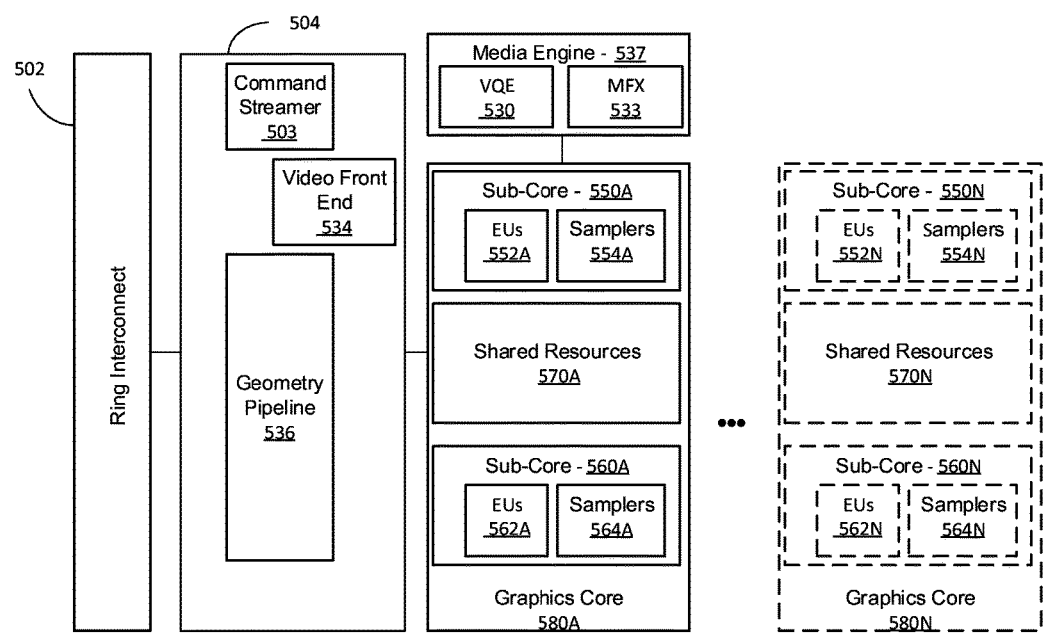
FIGS. 7-9 are block diagrams of examples of execution units according to an embodiment.
Figure 8:
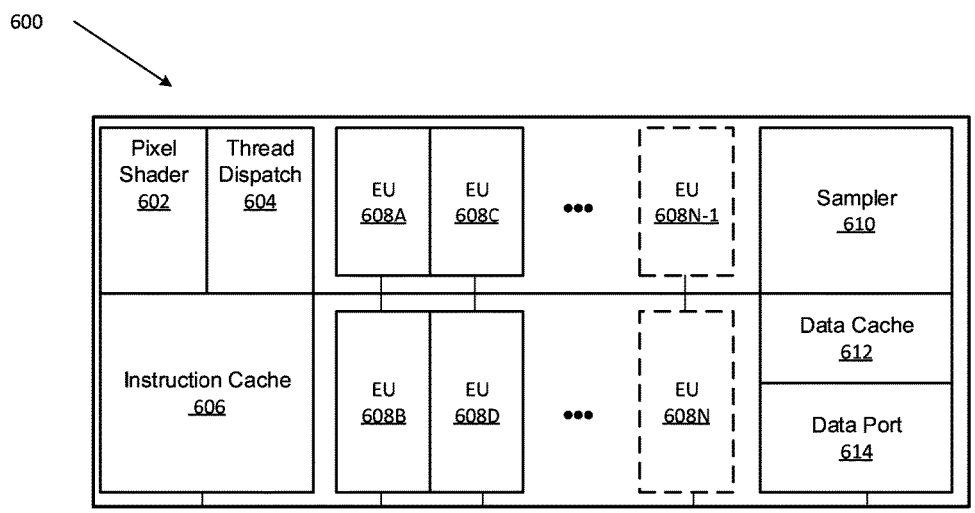
Figure 9:
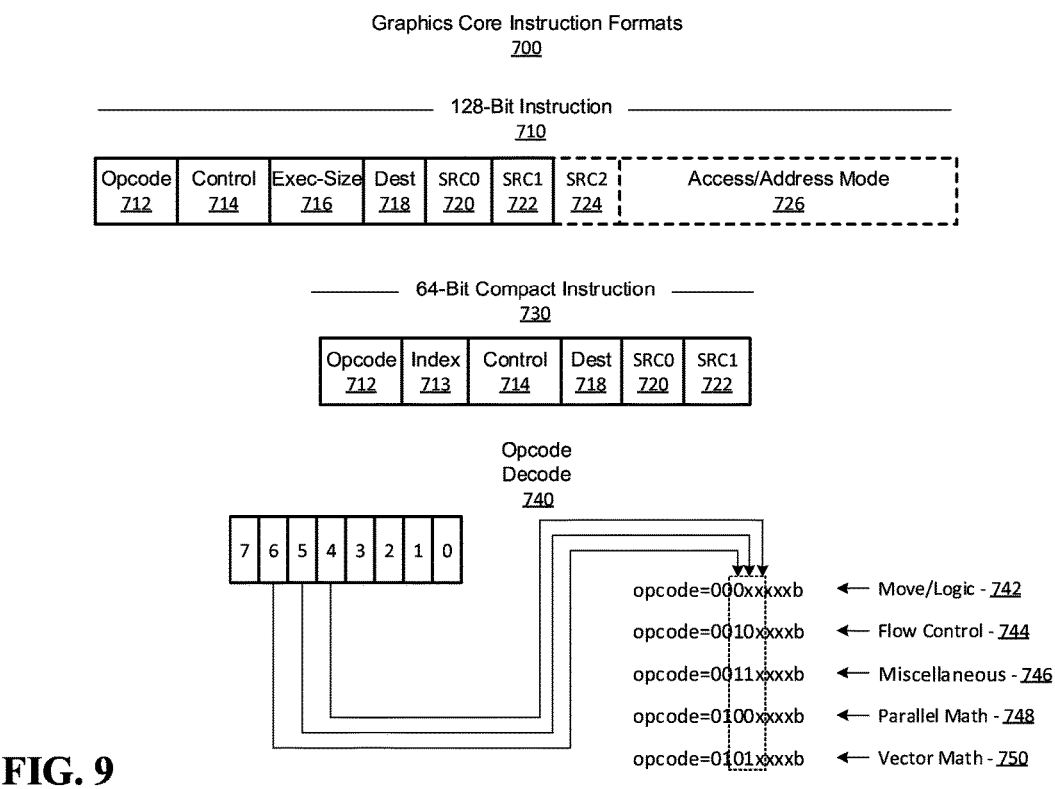

Execution Units—FIGS. 7-9

FIG. 7 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with the media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

FIG. 8 illustrates thread execution logic 600 including an array of processing elements employed in one embodiment of a graphics processing engine. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 7) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

FIG. 9 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 714 enables control over certain execution options, such as channel selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 720, src1 722, and one destination 718. In one embodiment, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 10:
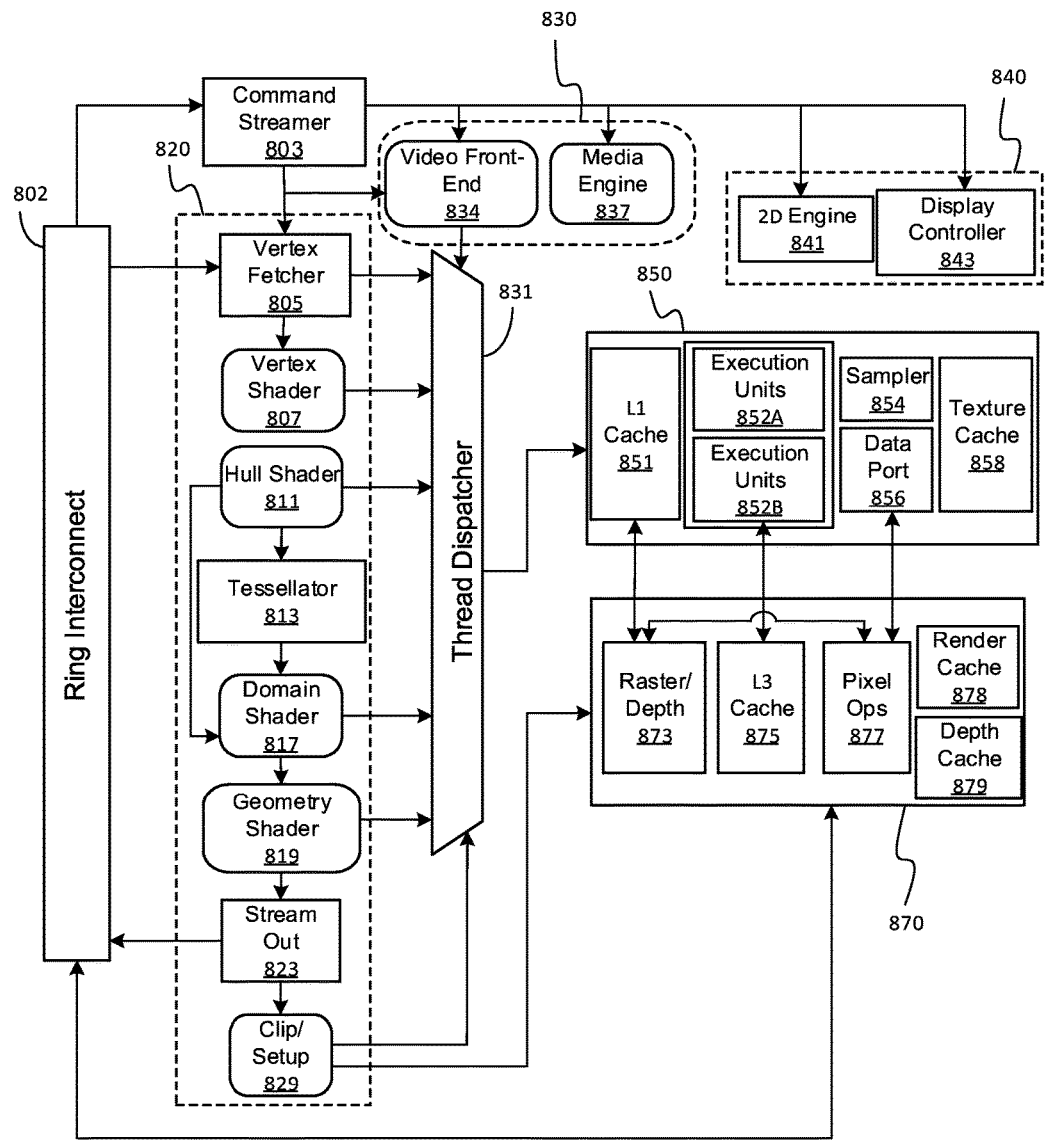
FIG. 10 is a block diagram of an example of a graphics pipeline according to an embodiment.

Graphics Pipeline—FIG. 10

FIG. 10 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 837 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine 837 includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 11A:
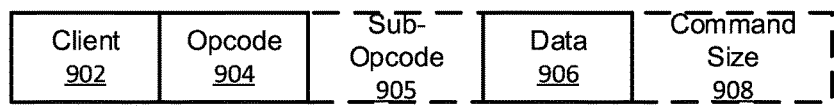
FIGS. 11A-11B are block diagrams of examples of graphics pipeline programming according to an embodiment.
Figure 11B:
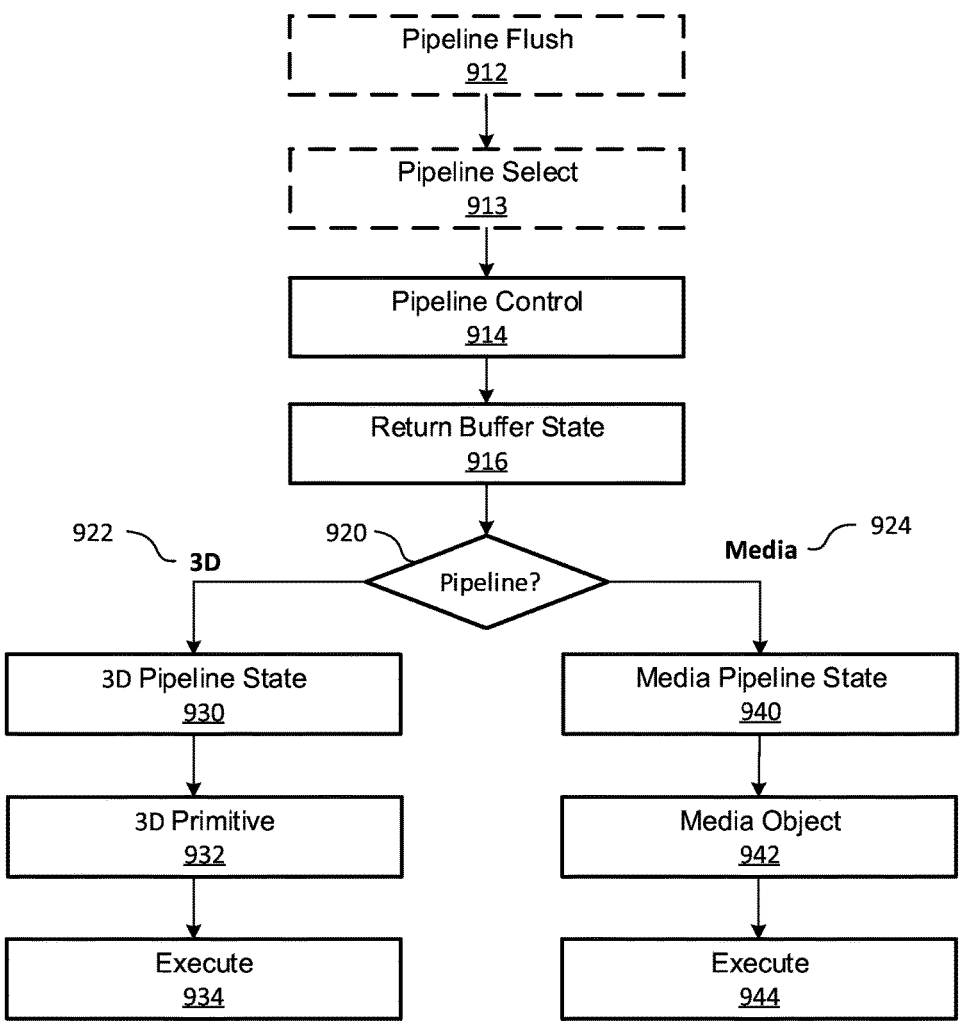

Graphics Pipeline Programming—FIGS. 11A-B

FIG. 11A is a block diagram illustrating a graphics processor command format according to an embodiment and FIG. 11B is a block diagram illustrating a graphics processor command sequence according to an embodiment. The solid lined boxes in FIG. 11A illustrate the components that are generally included in a graphics command while the dashed lines include components that are optional or that are only included in a sub-set of the graphics commands. The exemplary graphics processor command format 900 of FIG. 11A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 11B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state commands 916 include selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use of one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 944 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 12:
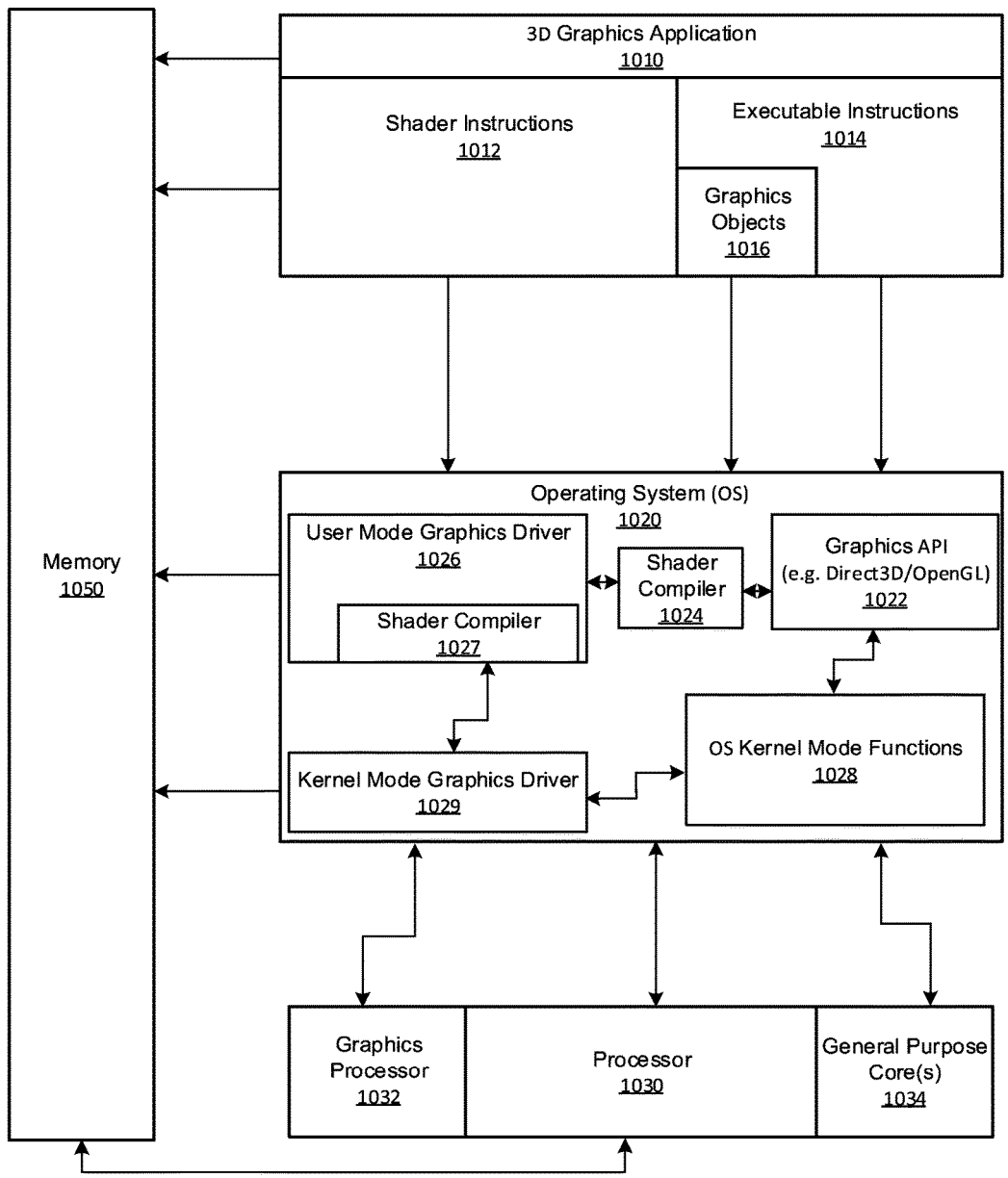
FIG. 12 is a block diagram of an example of a graphics software architecture according to an embodiment.

Graphics Software Architecture—FIG. 12

FIG. 12 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Additional Notes and Examples

Example 1 may include a computing system to process a single atomic operation comprising an instruction module to generate an instruction set to replace a plurality of atomic operations with a single atomic operation, the instruction module including an accumulation module to generate an accumulation instruction to compute a prefix sum for a plurality of initial values associated with a plurality of processing lanes to generate a plurality of accumulated values, and a broadcast module to generate a broadcast instruction to return a pre-existing value to be added with each of the plurality of accumulated values to generate a plurality of intermediate accumulated values. The computing system may further comprise a graphics processor to execute the instruction set to process the single atomic operation.

Example 2 may include the system of Example 1, wherein the instruction set is to include two or more of a same number of instructions for a uniform source value operation and a non-uniform source value operation, only about 5 instructions to about 10 instructions, and no loops.

Example 3 may include the system of any one of Examples 1 to 2, wherein the instruction module further includes two or more of a move module to generate a move instruction to copy an accumulation result value based on the plurality of accumulated values from an accumulation register to a result register, an atomic instruction module to generate an atomic instruction to add the accumulation result value with the pre-existing value to generate an atomic instruction result value that is to replace the pre-existing value in memory, and a subtraction module to generate a subtract instruction to subtract between each of the plurality of initial values and each of the plurality of intermediate accumulated values to generate a plurality of final values associated with the plurality of processing lanes.

Example 4 may include the system of any one of Examples 1 to 3, wherein the instruction module further includes a partition module to generate a partition instruction to logically partition the plurality of processing lanes into two or more subsets, wherein the accumulation module is to generate a first accumulation instruction for a plurality of first initial values associated with a first subset of the plurality of processing lanes to generate a plurality of first accumulated values and a second accumulation instruction for a plurality of second initial values associated with a second subset of the plurality of processing lanes to generate a plurality of second accumulated values.

Example 5 may include the system of any one of Examples 1 to 4, wherein the instruction module further includes a combination module to generate a combination instruction to add a first accumulation result value based on the plurality of first accumulated values with a second accumulation result value based on the plurality of second accumulated values to generate a combined accumulation result value, and a subset value update module to generate an update instruction to add the first accumulation result value with each of the plurality of second accumulated values to generate a plurality of updated accumulated values.

Example 6 may include the system of any one of Examples 1 to 5, wherein the atomic instruction module is to generate an atomic instruction to add the combined accumulation result value with the pre-existing value to generate the atomic instruction result value that is to replace the pre-existing value in the memory, and wherein the broadcast module is to generate a first broadcast instruction to return the pre-existing value to be added with each of the plurality of first accumulated values to generate a plurality of first intermediate accumulated values and a second broadcast instruction to return the pre-existing value to be added with each of the plurality of updated accumulated values to generate a plurality of second intermediate accumulated values.

Example 7 may include the system of any one of Examples 1 to 6, wherein the subtraction module is to generate a first subtract instruction to subtract between each of the plurality of first initial values and each of the plurality of first intermediate accumulated values and a second subtract instruction to subtract between each of the plurality of second initial values and each of the plurality of second intermediate accumulated values to generate the plurality of final values associated with the plurality of processing lanes.

Example 8 may include the system of any one of Examples 1 to 7, further including a compiler to apply the instruction module to generate the instruction set in a graphics hardware machine language, wherein the graphics processor is to include a single instruction multiple data (SIMD) architecture, and wherein the partial prefix sum is to be computed up to an SIMD execution engine length including one or more of eight processing lanes, sixteen processing lanes, and thirty-two processing lanes.

Example 9 may include a method to process a single atomic operation, comprising generating an instruction set to replace a plurality of atomic operations with a single atomic operation including generating an accumulation instruction to compute a prefix sum for a plurality of initial values associated with a plurality of processing lanes to generate a plurality of accumulated values, and generating a broadcast instruction to return a pre-existing value to be added with each of the plurality of accumulated values to generate a plurality of intermediate accumulated values. The method may further comprise executing the instruction set to process the single atomic operation.

Example 10 may include the method of Example 9, wherein the instruction set includes two or more of a same number of instructions for a uniform source value operation and a non-uniform source value operation, only about 5 instructions to about 10 instructions, and no loops.

Example 11 may include the method of any one of Examples 9 to 10, further including two or more of generating a move instruction to copy an accumulation result value based on the plurality of accumulated values from an accumulation register to a result register, generating an atomic instruction to add the accumulation result value with the pre-existing value to generate an atomic instruction result value that is to replace the pre-existing value in memory, and generating a subtract instruction to subtract between each of the plurality of initial values and each of the plurality of intermediate accumulated values to generate a plurality of final values associated with the plurality of processing lanes.

Example 12 may include the method of any one of claims Example 9 to 11, further including generating a partition instruction to logically partition the plurality of processing lanes into two or more subsets, generating a first accumulation instruction for a plurality of first initial values associated with a first subset of the plurality of processing lanes to generate a plurality of first accumulated values, and generating a second accumulation instruction for a plurality of second initial values associated with a second subset of the plurality of processing lanes to generate a plurality of second accumulated values.

Example 13 may include the method of any one of Examples 9 to 12, further including generating a combination instruction to add a first accumulation result value based on the plurality of first accumulated values with a second accumulation result value based on the plurality of second accumulated values to generate a combined accumulation result value, and generating an update instruction to add the first accumulation result value with each of the plurality of second accumulated values to generate a plurality of updated accumulated values.

Example 14 may include the method of any one of Examples 9 to 13, further including generating an atomic instruction to add the combined accumulation result value with the pre-existing value to generate the atomic instruction result value that is to replace the pre-existing value in the memory, generating a first broadcast instruction to return the pre-existing value to be added with each of the plurality of first accumulated values to generate a plurality of first intermediate accumulated values, and generating a second broadcast instruction to return the pre-existing value to be added with each of the plurality of updated accumulated values to generate a plurality of second intermediate accumulated values.

Example 15 may include the method of any one of Examples 9 to 14, further including generating a first subtract instruction to subtract between each of the plurality of first initial values and each of the plurality of first intermediate accumulated values, and generating a second subtract instruction to subtract between each of the plurality of second initial values and each of the plurality of second intermediate accumulated values to generate the plurality of final values associated with the plurality of processing lanes.

Example 16 may include the method of any one of Examples 9 to 15, wherein a compiler generates the instruction set in a graphics hardware machine language, wherein a graphics processor executes the instruction set, the graphics processor including a single instruction multiple data (SIMD) architecture, and wherein the partial prefix sum is computed up to an SIMD execution engine length including one or more of eight processing lanes, sixteen processing lanes, and thirty-two processing lanes.

Example 17 may include at least one computer readable storage medium comprising one or more instructions that when executed on a computing device cause the computing device to generate an instruction set to replace a plurality of atomic operations with a single atomic operation including an accumulation instruction to compute a prefix sum for a plurality of initial values associated with a plurality of processing lanes to generate a plurality of accumulated values and a broadcast instruction to return a pre-existing value to be added with each of the plurality of accumulated values to generate a plurality of intermediate accumulated values. The instructions, when executed, may further cause a computing system to execute the instruction set to process the single atomic operation.

Example 18 may include the at least one computer readable storage medium of Example 17, wherein the instruction set is to include two or more of a same number of instructions for a uniform source value operation and a non-uniform source value operation, only about 5 instructions to about 10 instructions, and no loops.

Example 19 may include the at least one computer readable storage medium of any one of Examples 17 to 18, wherein the instructions, when executed, cause a computing system to generate a move instruction to copy an accumulation result value based on the plurality of accumulated values from an accumulation register to a result register, generate an atomic instruction to add the accumulation result value with the pre-existing value to generate an atomic instruction result value that is to replace the pre-existing value in memory, and/or generate a subtract instruction to subtract between each of the plurality of initial values and each of the plurality of intermediate accumulated values to generate a plurality of final values associated with the plurality of processing lanes.

Example 20 may include the at least one computer readable storage medium of any one of Examples 17 to 19, wherein the instructions, when executed, cause a computing system to generate a partition instruction to logically partition the plurality of processing lanes into two or more subsets, generate a first accumulation instruction for a plurality of first initial values associated with a first subset of the plurality of processing lanes to generate a plurality of first accumulated values, and generate a second accumulation instruction for a plurality of second initial values associated with a second subset of the plurality of processing lanes to generate a plurality of second accumulated values.

Example 21 may include the at least one computer readable storage medium of any one of Examples 17 to 20, wherein the instructions, when executed, cause a computing system to generate a combination instruction to add a first accumulation result value based on the plurality of first accumulated values with a second accumulation result value based on the plurality of second accumulated values to generate a combined accumulation result value, and generate an update instruction to add the first accumulation result value with each of the plurality of second accumulated values to generate a plurality of updated accumulated values.

Example 22 may include the at least one computer readable storage medium of any one of Examples 17 to 21, wherein the instructions, when executed, cause a computing system to generate an atomic instruction to add the combined accumulation result value with the pre-existing value to generate the atomic instruction result value that is to replace the pre-existing value in the memory, generate a first broadcast instruction to return the pre-existing value to be added with each of the plurality of first accumulated values to generate a plurality of first intermediate accumulated values, and generate a second broadcast instruction to return the pre-existing value to be added with each of the plurality of updated accumulated values to generate a plurality of second intermediate accumulated values.

Example 23 may include the at least one computer readable storage medium of any one of Examples 17 to 22, wherein the instructions, when executed, cause a computing system to generate a first subtract instruction to subtract between each of the plurality of first initial values and each of the plurality of first intermediate accumulated values, and generate a second subtract instruction to subtract between each of the plurality of second initial values and each of the plurality of second intermediate accumulated values to generate the plurality of final values associated with the plurality of processing lanes.

Example 24 may include the at least one computer readable storage medium of any one of Examples 17 to 22, wherein a compiler is to generate the instruction set in a graphics hardware machine language, wherein a graphics processor is to execute the instruction set, the graphics processor to include a single instruction multiple data (SIMD) architecture, and wherein the partial prefix sum is to be computed up to an SIMD execution engine length including one or more of eight processing lanes, sixteen processing lanes, and thirty-two processing lanes.

Example 25 may include a computing system to process a single atomic operation, comprising means for generating an instruction set to replace a plurality of atomic operations with a single atomic operation including means for generating an accumulation instruction to compute a prefix sum for a plurality of initial values associated with a plurality of processing lanes to generate a plurality of accumulated values and means for generating a broadcast instruction to return a pre-existing value to be added with each of the plurality of accumulated values to generate a plurality of intermediate accumulated values, and means for executing the instruction set to process the single atomic operation.

Example 26 may include the computing system of Example 25, wherein the instruction set is to include two or more of a same number of instructions for a uniform source value operation and a non-uniform source value operation, only about 5 instructions to about 10 instructions, and no loops.

Example 27 may include the computing system of Examples 25 to 26, further including two or more of means for generating a move instruction to copy an accumulation result value based on the plurality of accumulated values from an accumulation register to a result register, means for generating an atomic instruction to add the accumulation result value with the pre-existing value to generate an atomic instruction result value that is to replace the pre-existing value in memory, and means for generating a subtract instruction to subtract between each of the plurality of initial values and each of the plurality of intermediate accumulated values to generate a plurality of final values associated with the plurality of processing lanes.

Example 28 may include the computing system of Examples 25 to 27, further including means for generating a partition instruction to logically partition the plurality of processing lanes into two or more subsets, means for generating a first accumulation instruction for a plurality of first initial values associated with a first subset of the plurality of processing lanes to generate a plurality of first accumulated values, and means for generating a second accumulation instruction for a plurality of second initial values associated with a second subset of the plurality of processing lanes to generate a plurality of second accumulated values.

Example 29 may include the computing system of Examples 25 to 28, further including means for generating a combination instruction to add a first accumulation result value based on the plurality of first accumulated values with a second accumulation result value based on the plurality of second accumulated values to generate a combined accumulation result value, and means for generating an update instruction to add the first accumulation result value with each of the plurality of second accumulated values to generate a plurality of updated accumulated values.

Example 30 may include the computing system of Examples 25 to 29, further including means for generating an atomic instruction to add the combined accumulation result value with the pre-existing value to generate the atomic instruction result value that is to replace the pre-existing value in the memory, means for generating a first broadcast instruction to return the pre-existing value to be added with each of the plurality of first accumulated values to generate a plurality of first intermediate accumulated values, and means for generating a second broadcast instruction to return the pre-existing value to be added with each of the plurality of updated accumulated values to generate a plurality of second intermediate accumulated values.

Example 31 may include the computing system of Examples 25 to 30, further including means for generating a first subtract instruction to subtract between each of the plurality of first initial values and each of the plurality of first intermediate accumulated values, and means for generating a second subtract instruction to subtract between each of the plurality of second initial values and each of the plurality of second intermediate accumulated values to generate the plurality of final values associated with the plurality of processing lanes.

Example 32 may include the computing system of Examples 25 to 31, wherein a compiler is to generate the instruction set in a graphics hardware machine language, wherein a graphics processor is to execute the instruction set, the graphics processor to include a single instruction multiple data (SIMD) architecture, and wherein the partial prefix sum is to be computed up to an SIMD execution engine length including one or more of eight processing lanes, sixteen processing lanes, and thirty-two processing lanes.

Techniques described herein may therefore allow a just-in-time (JIT) compiler to generate relatively better code. For example, a single scalar atomic instruction can generate 20 instructions. When a single lane is active, about 20 instructions may be executed. When all lanes are active, about 98 instructions may be executed. Techniques described there may reduce the instructions generated as well as executed to about 4 instructions (SIMD8/SIMD16)/8 instructions (SIMD32). Such a reduction may significantly improve performance for, e.g., compute and/or graphics applications which use atomic instructions. Moreover, substantially all high level APIs targeting a processor (e.g., graphics processor) may benefit from the techniques described herein, including DirectX, OpenCL, OpenGL, Cilk™ Plus, and C-for-Media. In addition, atomic instruction support may be generalized, and/or hardware complexity may be reduced. Finally, a prefix sum may be calculated in hardware (e.g., using a processor, registers, memory, etc.), which may be useful to replace a plurality of atomic operations with a single atomic operation, to implement the atomic operation, and so on.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   an instruction module to generate an instruction set to replace a plurality of atomic operations with a single atomic operation, the instruction module including:
      an accumulation module to generate an accumulation instruction to compute a prefix sum for a plurality of initial values associated with a plurality of processing lanes to generate a plurality of accumulated values; and
      a broadcast module to generate a broadcast instruction to read a value to be independently added with each of the plurality of accumulated values to generate a plurality of intermediate accumulated values; and
   a graphics processor to execute the instruction set to process the single atomic operation.

2. The system of claim 1, wherein the instruction set is to include two or more of a same number of instructions for a uniform source value operation and a non-uniform source value operation, only about 5 instructions to about 10 instructions, and no loops.

3. The system of claim 1, wherein the instruction module further includes two or more of:
   a move module to generate a move instruction to copy an accumulation result value based on the plurality of accumulated values from an accumulation register to a result register;
   an atomic instruction module to generate an atomic instruction to add the accumulation result value with the value to generate an atomic instruction result value that is to replace the value in memory; and
   a subtraction module to generate a subtract instruction to subtract between each of the plurality of initial values and each of the plurality of intermediate accumulated values to generate a plurality of final values associated with the plurality of processing lanes.

4. The system of claim 3, wherein the instruction module further includes a partition module to generate a partition instruction to logically partition the plurality of processing lanes into two or more subsets, wherein the accumulation module is to generate a first accumulation instruction for a plurality of first initial values associated with a first subset of the plurality of processing lanes to generate a plurality of first accumulated values and a second accumulation instruction for a plurality of second initial values associated with a second subset of the plurality of processing lanes to generate a plurality of second accumulated values.

5. The system of claim 4, wherein the instruction module further includes:
   a combination module to generate a combination instruction to add a first accumulation result value based on the plurality of first accumulated values with a second accumulation result value based on the plurality of second accumulated values to generate a combined accumulation result value; and
   a subset value update module to generate an update instruction to add the first accumulation result value with each of the plurality of second accumulated values to generate a plurality of updated accumulated values.

6. The system of claim 5, wherein the atomic instruction module is to generate an atomic instruction to add the combined accumulation result value with the value to generate the atomic instruction result value that is to replace the value in the memory, and wherein the broadcast module is to generate a first broadcast instruction to read the value to be added with each of the plurality of first accumulated values to generate a plurality of first intermediate accumulated values and a second broadcast instruction to read the value to be added with each of the plurality of updated accumulated values to generate a plurality of second intermediate accumulated values.

7. The system of claim 6, wherein the subtraction module is to generate a first subtract instruction to subtract between each of the plurality of first initial values and each of the plurality of first intermediate accumulated values and a second subtract instruction to subtract between each of the plurality of second initial values and each of the plurality of second intermediate accumulated values to generate the plurality of final values associated with the plurality of processing lanes.

8. The system of claim 1, further including a compiler to apply the instruction module to generate the instruction set in a graphics hardware machine language, wherein the graphics processor is to include a single instruction multiple data (SIMD) architecture, and wherein the partial prefix sum is to be computed up to an SIMD execution engine length including one or more of eight processing lanes, sixteen processing lanes, and thirty-two processing lanes.

9. A computer implemented method comprising:
   generating an instruction set to replace a plurality of atomic operations with a single atomic operation including:
      generating an accumulation instruction to compute a prefix sum for a plurality of initial values associated with a plurality of processing lanes to generate a plurality of accumulated values; and
      generating a broadcast instruction to read a value to be independently added with each of the plurality of accumulated values to generate a plurality of intermediate accumulated values; and
   executing the instruction set to process the single atomic operation.

10. The computer implemented method of claim 9, wherein the instruction set includes two or more of a same number of instructions for a uniform source value operation and a non-uniform source value operation, only about 5 instructions to about 10 instructions, and no loops.

11. The computer implemented method of claim 9, further including two or more of:
   generating a move instruction to copy an accumulation result value based on the plurality of accumulated values from an accumulation register to a result register;
   generating an atomic instruction to add the accumulation result value with the value to generate an atomic instruction result value that is to replace the value in memory; and
   generating a subtract instruction to subtract between each of the plurality of initial values and each of the plurality of intermediate accumulated values to generate a plurality of final values associated with the plurality of processing lanes.

12. The computer implemented method of claim 11, further including:
   generating a partition instruction to logically partition the plurality of processing lanes into two or more subsets;

generating a first accumulation instruction for a plurality of first initial values associated with a first subset of the plurality of processing lanes to generate a plurality of first accumulated values; and generating a second accumulation instruction for a plurality of second initial values associated with a second subset of the plurality of processing lanes to generate a plurality of second accumulated values.

13. The computer implemented method of claim 12, further including:

generating a combination instruction to add a first accumulation result value based on the plurality of first accumulated values with a second accumulation result value based on the plurality of second accumulated values to generate a combined accumulation result value; and generating an update instruction to add the first accumulation result value with each of the plurality of second accumulated values to generate a plurality of updated accumulated values.

14. The computer implemented method of claim 13, further including:

generating an atomic instruction to add the combined accumulation result value with the value to generate the atomic instruction result value that is to replace the value in the memory;

generating a first broadcast instruction to read the value to be added with each of the plurality of first accumulated values to generate a plurality of first intermediate accumulated values; and generating a second broadcast instruction to read the value to be added with each of the plurality of updated accumulated values to generate a plurality of second intermediate accumulated values.

15. The computer implemented method of claim 14, further including:

generating a first subtract instruction to subtract between each of the plurality of first initial values and each of the plurality of first intermediate accumulated values; and generating a second subtract instruction to subtract between each of the plurality of second initial values and each of the plurality of second intermediate accumulated values to generate the plurality of final values associated with the plurality of processing lanes.

16. The computer implemented method of claim 9, wherein a compiler generates the instruction set in a graphics hardware machine language, wherein a graphics processor executes the instruction set, the graphics processor including a single instruction multiple data (SIMD) architecture, and wherein the partial prefix sum is computed up to an SIMD execution engine length including one or more of eight processing lanes, sixteen processing lanes, and thirty-two processing lanes.

17. At least one non-transitory computer readable storage medium comprising one or more instructions that when executed on a computing device cause the computing device to:

generate an instruction set to replace a plurality of atomic operations with a single atomic operation including an accumulation instruction to compute a prefix sum for a plurality of initial values associated with a plurality of processing lanes to generate a plurality of accumulated values and a broadcast instruction to read a value to be independently added with each of the plurality of accumulated values to generate a plurality of intermediate accumulated values; and execute the instruction set to process the single atomic operation.

18. The at least one medium of claim 17, wherein the instruction set is to include two or more of a same number of instructions for a uniform source value operation and a non-uniform source value operation, only about 5 instructions to about 10 instructions, and no loops.

19. The at least one medium of claim 17, wherein when executed the one or more instructions cause the computing device to:

generate a move instruction to copy an accumulation result value based on the plurality of accumulated values from an accumulation register to a result register;

generate an atomic instruction to add the accumulation result value with the value to generate an atomic instruction result value that is to replace the value in memory; and/or generate a subtract instruction to subtract between each of the plurality of initial values and each of the plurality of intermediate accumulated values to generate a plurality of final values associated with the plurality of processing lanes.

20. The at least one medium of claim 19, wherein when executed the one or more instructions cause the computing device to:

generate a partition instruction to logically partition the plurality of processing lanes into two or more subsets;

generate a first accumulation instruction for a plurality of first initial values associated with a first subset of the plurality of processing lanes to generate a plurality of first accumulated values; and generate a second accumulation instruction for a plurality of second initial values associated with a second subset of the plurality of processing lanes to generate a plurality of second accumulated values.

21. The at least one medium of claim 20, wherein when executed the one or more instructions cause the computing device to:

generate a combination instruction to add a first accumulation result value based on the plurality of first accumulated values with a second accumulation result value based on the plurality of second accumulated values to generate a combined accumulation result value; and generate an update instruction to add the first accumulation result value with each of the plurality of second accumulated values to generate a plurality of updated accumulated values.

22. The at least one medium of claim 21, wherein when executed the one or more instructions cause the computing device to:

generate an atomic instruction to add the combined accumulation result value with the value to generate the atomic instruction result value that is to replace the value in the memory;

generate a first broadcast instruction to read the value to be added with each of the plurality of first accumulated values to generate a plurality of first intermediate accumulated values; and generate a second broadcast instruction to read the value to be added with each of the plurality of updated accumulated values to generate a plurality of second intermediate accumulated values.

23. The at least one medium of claim 22, wherein when executed the one or more instructions cause the computing device to:

generate a first subtract instruction to subtract between each of the plurality of first initial values and each of the plurality of first intermediate accumulated values; and generate a second subtract instruction to subtract between each of the plurality of second initial values and each of the plurality of second intermediate accumulated values to generate the plurality of final values associated with the plurality of processing lanes.

24. The at least one medium of claim 17, wherein a compiler is to generate the instruction set in a graphics hardware machine language, wherein a graphics processor is to execute the instruction set, the graphics processor to include a single instruction multiple data (SIMD) architecture, and wherein the partial prefix sum is to be computed up to an SIMD execution engine length including one or more of eight processing lanes, sixteen processing lanes, and thirty-two processing lanes.

* * * * *